RECEIVER CIRCUITS FOR SELECTIVE CALLING

Filed July 28, 1959

INVENTOR

EBERTUS WILLEMS

BY

Frank R. Jifari

AGENT

United States Patent Office 3,119,982
Patented Jan. 28, 1964

3,119,982

RECEIVER CIRCUITS FOR SELECTIVE CALLING

Ebertus Willems, Eindhoven, Netherlands, assignor to North American Philips Company, Inc., New York, N.Y., a corporation of Delaware Filed July 28, 1959, Ser. No. 830,063
Claims priority, application Germany Aug. 9, 1958
6 Claims. (Cl. 340—171)

This invention relates to a transmission system comprising a transmitter and a plurality of receivers with selective calling of each receiver of the system. In the transmission system according to the invention a number of different call frequencies are transmitted at the transmitter end and are received at each receiver by means of a number of selective networks; each network is tuned to one of these call frequencies, the arrangement being such that a receiver to be selected becomes responsive to each of the call frequencies only after reception of the chronologically preceding call frequency in the sequence of call frequencies characteristic for the receiver.

It is an object of the present invention to provide a simple, reliable and advantageous circuit arrangement of this kind utilizing transistors, in particular junction transistors, each of which acts simultaneously as a rectifier and a switching element.

The circuit-arrangement according to the invention is characterized in that each call frequency chronologically preceding another is applied, in the receiver, to the base circuit of a transistor and is rectified in this circuit so that it biases the base of this transistor in the reverse direction, and in that the emitter-collector circuit of each transistor shunts the reception circuit for the chronologically succeeding call frequency; this arrangement effectively prevents the reception of a call frequency before reception of the chronologically preceding call frequency.

Figure 1:
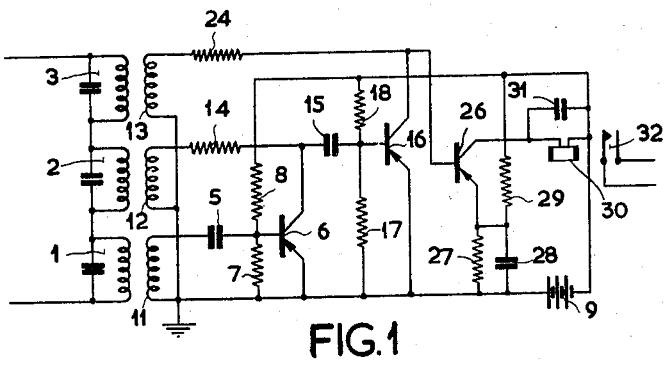
Figure 2:
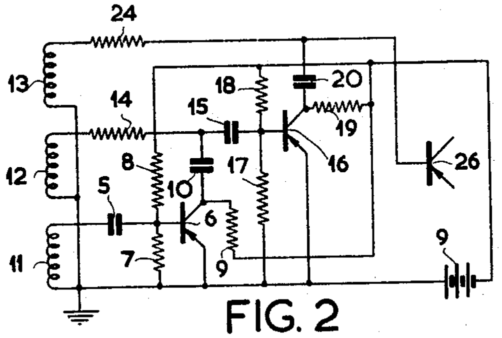
Figure 3:
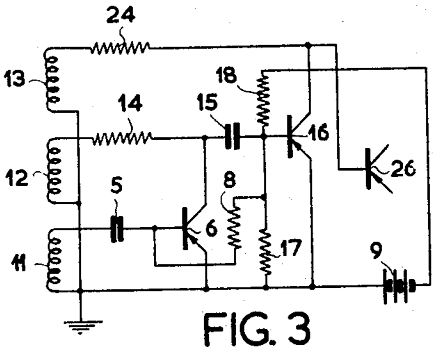

In order that the invention may readily be carried out, embodiments thereof will now be described, by way of example, with reference to the accompanying diagrammatic drawing, in which:

FIG. 1 is a schematic circuit diagram of one embodiment of a receiver according to the invention, and FIGS. 2 and 3 show two modifications of the embodiment of FIG. 1. Referring now to the figures, FIG. 1 is a circuit diagram of part of a receiver for selective calling. The part shown contains a number of parallel resonant circuits 1, 2 and 3 each tuned to a different call frequency. To each of these resonant circuits there is coupled a secondary winding 11, 12 and 13, respectively. One end of each secondary is connected to ground as shown while the other end is connected to the base of an associated transistor 6, 16 and 26, respectively. The winding 11 is connected to the base of transistor 6 through a capacitor 5, the winding 12 is connected to the base of transistor 16 through the series connection of a resistor 14 and a capacitor 15, and the winding 13 is connected to the base of the transistor 26 through a resistor 24. The base of the transistor 6 is connected to ground through a resistor 7 and to the negative terminal of a voltage source 9 through a resistor 8. The emitter of transistor 6 is directly connected to ground while its collector is connected to the junction of the resistor 14 and the capacitor 15. The base of the transistor 16 is biased similarly to the base of the transistor 6 through resistors 17 and 18. The emitter of the transistor 16 is directly connected to ground similarly to that of the transistor 6, and its collector is connected to the base of transistor 26. The emitter of the latter transistor is biased in the reverse direction by means of a voltage divider 27—29 and is connected to ground and to the positive terminal of the voltage source 9 through a capacitor 28. The collector of the transistor

26 is connected to the negative terminal of the voltage source 9 through a relay winding 30 which is bypassed by means of a capacitor 31. The relay winding 30 operates a call contact 32. It is thus seen that in the normal condition of the circuit, when no calls are being received, transistors 6 and 16 are conductive and transistor 26 is cut off.

The relay winding 30 is energized by the collector current of the transistor 26. However, this collector current can flow only if a voltage having an amplitude sufficient to overcome the reverse emitter bias of the this transistor is applied to its base. For this purpose, a sufficient operating voltage having frequency $f_3$ must be produced by the source 3 across the winding 13. However, this voltage across the winding 13 is applied to the base of the cut-off transistor 26 through the resistor 24 which, together with the collector-emitter path of the transistor 16, constitutes a voltage divider in the base circuit of transistor 26. Owing to the negative bias applied to the base of the transistor 16 through the resistor 18, this transistor is normally comparatively highly conductive so that its collector-emitter path offers only a small alternating current impedance. Hence a call signal consisting solely of frequency $f_3$ is highly attenuated by the voltage divider 24, 16, so that the amplitude of the oscillations applied to the base of the transistor 26 remains smaller than the emitter bias and is not of sufficient magnitude to render this transistor conductive.

In order, therefore, to cause the oscillations set up across the circuit 3 to energize the relay comprising the winding 30, the transistors 16 must first be cut off. If this transistor is cut off, the oscillations across circuit 3 reach the base of the transistor 26 without material attenuation, are rectified by the base emitter path of this transistor, and produce a collector current through the winding 30. The transistor 16 is cut off when either before or simultaneously with the reception of a call signal of frequency $f_3$ in the circuit 3 a call signal of frequency $f_2$ is produced in the resonant circuit 2. However, the oscillations of frequency $f_2$ produced across the winding 12 can reach the base of the transistor 16 through the resistor 14 and the capacitor 15 only when the transistor 6 is cut off. When the transistor 6 is conductive, its collector-emitter path forms a voltage divider with the resistor 14 whereby the oscillations set up across the winding 12 are highly attenuated before reaching the base of the transistor 16.

Consequently, the transistor 6 must also be cut-off either before the oscillations of frequency $f_3$ and the oscillations of frequency $f_2$ are received or simultaneously with the reception of these oscillations. The transistor 6 is cut off in a similar fashion as the transistor 16. When a call signal of frequency $f_1$ is received, an alternating voltage is produced in the resonant circuit 1 and across the winding 11. This voltage is applied to the base of the transistor 6 through the capacitor 5 and is partially rectified by the base-emitter path of this transistor. The potential of the base of the transistor 6 is shifted in the positive direction by this rectification, the capacitor 5 is reversely charged until the base of the transistor 6 becomes positive with respect to its emitter, and the collector-emitter path of the transistor 6 is cut off by this shifting of the operating point. A call signal of frequency $f_2$ can now freely reach the base of the transistor 16. The transistor 16 is cut-off by this signal and finally a call signal of frequency $f_3$ can similarly reach the base of the transistor 26.

Hence, in order for the winding 30 to be energized, a call signal of frequency $f_1$ must first be set up in the resonant circuit 1, subsequently or simultaneously a second call signal of frequency $f_2$ must be produced across the resonant circuit 2 and subsequently or simultaneously, a third call signal of frequency $f_3$ must be set up across the resonant circuit 3. The capacitor 5 forms a time-constant network, together with the resistor 7, the resistor 8 and the cut-off resistance of the base-emitter path of the transistor 6. Therefore, when the transistor 6 is cut off by the call signal of frequency $f_1$, it becomes conductive again only after a period determined by this network. Similarly, the capacitor 15, the resistors 17 and 18 and the cut-off resistance of the base-emitter path of the transistor 16 form a time-constant network. The transistor 6 can be cut off comparatively rapidly if the internal impedance of the signal source comprising the resonant circuit 1 and the secondary winding 11 is not excessively large. The resistor 14 must be comparatively large relative to the alternating current impedance of the collector emitter path of the conductive transistor 6. Hence, the charging time constant of the capacitor 15 exceeds that of the capacitor 5. Consequently, in order to ensure correct operation of the circuit arrangement, the discharge time constant of the capacitor 5 must exceed the charge time constant of the capacitor 15.

The circuit arrangement described renders it possible to increase greatly in a very simple manner the number of receivers of a transmission system which can be selectively called, without changing the number of available call frequencies. Obviously, only two call frequencies per receiver could be sufficient for operation in accordance with the invention. If, for example, 14 different call frequencies are available, then $14^3=2,744$ receivers can be selectively called by using these frequencies in the described circuit arrangement and with a fixed duration and sequence of the call pulses of the various frequencies. If only two different frequencies are used per receiver then $14^2=196$ different receivers can be selectively called. Preferably the circuit arrangement uses only different frequencies for the resonant circuits so that the duration of the call pulses is unlimited and the number of receivers is reduced to 14.13.12=2,184 or to 14.13=182.

FIG. 2 shows a modification of the circuit-arrangement shown in FIG. 1 which differs therefrom in that the collectors of the transistors 6 and 16 of FIG. 2 are biased in the reverse direction through comparatively large load resistors 9 and 19 respectively, so that they cannot be driven in the forward direction by the oscillations across the windings 12 and 13 respectively; such forward drive might, under certain circumstances, result in undesirable collector-base rectification. These collectors are separated for direct current from the base circuits of the succeeding transistors 16 and 26 by means of capacitors 10 and 20 respectively, which have large capacitance values and small impedance at the frequencies $f_2$ and $f_3$ respectively. The resistors 9 and 19 are so large that each of transistors 6 and 16 operates below the knee of its collector current-voltage characteristic and consequently provides a low alternating current impedance.

FIG. 3 shows another modification of the circuit arrangement shown in FIG. 1. The difference with respect thereto consists in that the resistor 8 connected in the base circuit of the transistor 6 is not directly connected to the negative terminal of the voltage source 9 but to a tapping on the voltage divider 17 to 18 of the base circuit of the transistor 16. The base-emitter resistor 7 of FIG. 1 is omitted. Hence, the base of the transistor 6 is biased in the reverse direction through the resistors 8 and 18 and the time-constant network of the base-circuit of this transistor now comprises the capacitor 5 and the resistor 8 in series with the base-emitter circuit of the transistor 16 and in parallel with the base-emitter path of the transistor 6. Owing to its connection to the resistor 8, the time-constant network in the base circuit of the transistor 16 is slightly influenced by this resistor in series with the base emitter path of the transistor 6. This circuit arrangement ensures that the transistor 6, after it has been cut off owing to the capacitor 5 being charged, can be kept cut off by an eventual charge of the capacitor 15. As long as the transistor 6 is cut off, the potenial applied to its base is substantially equal to that applied to the base of the transistor 16, if the latter is also cut off. On the other hand, if the transistor 16 is not cut off, its base is comparatively only slightly biased in the reverse direction by the cut off voltage at the base of the transistor 6, because the capacitor 5 discharges through the resistor 8 in series with the resistor 17 and the base emitter path of the transistor 16; this results in a voltage division such that the base of the transistor 16, which base is biased in the forward direction through the resistor 88, is only slightly driven in the reverse direction.

On the whole the circuit-arrangement of FIG. 3 operates similarly to that of FIG. 1, with, however, this difference: when the transistor 16 is cut off by rectification of a call, signal of frequency $f_2$, the transistor 6 also remains cut off. This provides a much greater degree of freedom with respect to the chronological sequence of the transmission of the various call signals of frequencies $f_1$ and $f_2$ and/or in the choice of the time constants of the base circuits of the transistors 6 and 16. Even with a small discharge time constant of the base circuit of the transistor 6, the call signals of frequencies $f_1$ and $f_2$ can be transmitted one after the other; this discharge time constant need only be sufficient to keep the transistor 6 cut off during the time interval between the respective transmissions of the call signals of frequencies $f_1$ and $f_2$. In this case and as with the embodiment of FIG. 1, the discharge time constant of the capacitor 15 must be large enough to bridge the time interval between cut off of the transistor 16 and termination of the call signal of frequency $f_2$ on the one hand and the commencement of the call signal of frequency $f_3$ and the energization of the relay with the winding 30 on the other hand.

Under certain circumstances, the resistors 14 and/or 24 may be constituted by the internal resistances of the sources 2 to 12 and/or 3 to 13 of the associated call frequencies.

What I claim is:

1. A receiver for providing selective operation in response to a calling signal including a plurality of different predetermined frequencies arranged in chronological sequence, comprising a plurality of selective networks, each network being tuned to a different one of said predetermined frequencies, a plurality of transistors corresponding respectively to said selective networks, each transistor having an emitter, a collector and a base electrode, a coupling network for coupling each of said selective networks to the base electrode of its corresponding transistor, means for normally biasing to cut off the transistor corresponding to the last frequency of the sequence, means for normally biasing each of the remaining transistors to conduction, the emitter-collector circuit of each conducting transistor being connected to the coupling network of the next-succeeding network and thereby normally shunting the oscillations from the next succeeding selective network to the base of its associated transistor, each transistor rectifying the signal applied to its base by base-emitter rectification in a normally conducting transistor, said rectification biasing the base electrode reversely and causing a normally conducting transistor to be cut-off and by collector rectification in a normally cut-off transistor, said rectification causing a current to flow in the collector circuit of a normally cut-off transistor if the chronologically preceding frequency has been received and detected, the cutting-off of a transistor removing said shunt for the oscillations from the next succeeding selective network to its corresponding transistor, the receiver thereby becoming responsive to each of the frequencies only after reception of a preceding frequency.

2. A circuit arrangement as claimed in claim 1, further comprising a capacitative coupling between the base of each normally conductive transistor and its associated selective network.

3. A circuit arrangement as claimed in claim 2, the biasing network for each said normally conducting transistor comprising a resistor connected to the base electrode of the transistor in parallel with the capacitative coupling, said resistor forming, with its associated capacitative coupling, a network having a time constant such that each transistor is biased in the reverse direction at least until a succeeding signal frequency is received by the next succeeding selective network.

4. A receiver for providing selective operation in response to a calling signal including a plurality of different predetermined frequencies arranged in chronological sequence, comprising a plurality of selective networks, each network being tuned to a different one of said predetermined frequencies, a plurality of transistors corresponding respectively to said selective networks, each transistor having an emitter, a collector and a base electrode, a coupling network for coupling each of said selective networks to the base electrode of its corresponding transistor, means for normally biasing to cut off the transistor corresponding to the last freqnency of the sequence, means for normally biasing each of the remaining transistors to conduction, the collector of each conducting transistors being coupled through a capacitor to the coupling network of the next succeeding network and thereby normally shunting the oscillations from the next succeeding selective network to the base of its associated transistor, the collector of each conducting transistor also being connected to one end of a load resistor, the other end of said load resistor being connected to one terminal of a source of power supply, each transistor rectifying the signal applied to its base by base-emitter rectification in a normally conducting transistor, said rectification biasing the base electrode reversely and causing a normally conducting transistor to be cut off, and by collector rectification in a normally cut off transistor, said rectification causing a current to flow in the collector circuit of a normally cut off transistor if the chronologically preceding frequency has been received and detected, the cutting off of a transistor removing said shunt for the oscillations from the next succeeding selective network to its corresponding transistor, the receiver thereby becoming responsive to each of the frequencies only after reception of a preceding frequency.

5. A receiver for providing selective operation in response to a calling signal including a plurality of different predetermined frequencies arranged in chronological sequence, comprising three selective networks, each network being tuned to a different one of said predetermined frequencies, three transistors corresponding respectively to said selective networks, each transistor having an emitter, a collector and a base electrode, a coupling network for coupling each of said selective networks to the base electrode of its corresponding transistor, means for normally biasing to cut off the transistor corresponding to the last frequency of the sequence, means for normally biasing each of the remaining transistors to conduction, said means comprising a voltage divider connected across a source of power supply, the base electrode of one conducting transistor being directly connected to a tap on said divider, the base electrode of the other conducting transistor being connected through a resistor to said tap, the emitter-collector circuit of each conducting transistor being connected to the coupling network of the next succeeding network and thereby normally shunting the oscillations from the next succeeding selective network to the base of its associated transistor, each transistor rectifying the signal applied to its base by base-emitter rectification in a normally conducting transistor, said rectification biasing the base electrode reversely and causing a normally conducting transistor to be cut off, and by collector rectification in a normally cut off transistor, said rectification causing a current to flow in the collector circuit of a normally cut off transistor if the chronologically preceding frequency has been received and detected thus, the cutting off of a transistor removing said shunt for the oscillations from the next-succeeding selective network to its corresponding transistor, the receiver thereby becoming responsive to each of the frequencies only after reception of a preceding frequency.

6. A receiver for providing selective operation in response to a calling signal including a plurality of different predetermined frequencies arranged in chronological sequence, comprising a plurality of selective networks, each network being tuned to a different one of said predetermined frequencies, a plurality of transistors corresponding respectively to said selective networks, each transistor having an emitter, a collector and a base electrode, a coupling network for coupling each of said selective networks to the base electrode of its corresponding transistor, means for normally biasing to cut off the transistor corresponding to the last frequency of the sequence, means for normally biasing each of the remaining transistors to conduction, said means comprising a voltage divider connected across a source of power supply, the base electrode of one conducting transistor being directly connected to a tap on said divider, the base electrode of the other conducting transistor being connected through a resistor to said tap, the collector of each conducting transistor being coupled through a capacitor to the coupling network of the next-succeeding network and thereby normally shunting the oscillations from the next-succeeding selective network to the base of its associated transistor, the collector of each conducting transistor also being connected to one end of a load resistor, the other end of said load resistor being connected to one terminal of a source of power supply, each transistor rectifying the signal applied to its base by base-emitter rectification in a normally conducting transistor, said rectification biasing the base electrode reversely and causing a normally conducting transistor to be cut off, and by collector rectification in a normally cut off transistor, said rectification causing a current to flow in the collector circuit of a normally cut off transistor if the chronologically preceding frequency has been received and detected, the cutting off of a transistor removing said shunt for the oscillations from the next-succeeding selective network to its corresponding transistor, the receiver thereby becoming responsive to each of the frequencies only after reception of a preceding frequency.

References Cited in the file of this patent

UNITED STATES PATENTS

| | | |
|---|---|---|
| 2,457,730 | Roberts | Dec. 28, 1948 |
| 2,547,025 | Noble | Apr. 3, 1951 |
| 2,724,049 | Ronalt | Nov. 15, 1955 |